United States Patent [19]

Darasko

[11] 4,445,699
[45] May 1, 1984

[54] COASTER AND SWIVEL ASSEMBLY THEREFOR

[76] Inventor: Edward Darasko, 30 Northfield Rd. Apt. 211, Bedford, Ohio 44146

[21] Appl. No.: 309,928

[22] Filed: Oct. 9, 1981

[51] Int. Cl.³ ............................................. B62M 1/00
[52] U.S. Cl. ......................... 280/87.04 R; 280/11.23; 280/266; 280/92
[58] Field of Search ................... 280/11.23, 87.1, 265, 280/11.2, 92, 270, 87.04 R, 87.04 B, 87.01, 11.1 BT, 2, 266; 180/316, DIG. 1, DIG. 2; 301/124 R

[56] References Cited

U.S. PATENT DOCUMENTS

| | | | |
|---|---|---|---|
| 2,063,627 | 12/1936 | Ruf | 280/87.01 |
| 3,876,217 | 4/1975 | Copier | 280/11.23 |
| 4,225,147 | 9/1980 | Lowery | 280/11.23 |

FOREIGN PATENT DOCUMENTS 959743 of 1947 France ............................. 280/11.1

*Primary Examiner*—David M. Mitchell
*Assistant Examiner*—Joseph McCarthy
*Attorney, Agent, or Firm*—Maky, Renner, Otto & Boisselle

[57] ABSTRACT

The coaster includes a wheeled foot platform, the steerable wheel of which is rotatable on a swiveled axle for effecting a steering action. The swiveled axle extends through aligned horizontal slots in vertical axle guides where are spherically curved. Each axle guide has at least one axially extending flange on which rides a bearing element or roller assembled on the axle. The roller and another bearing element assembled on the axle have complementary curved surfaces in sliding bearing engagement with opposite curved sides of each guide for axially constrained swiveled or turning movement of the axle. Steering of the coaster is obtained by a foot steerable plate mounted for pivotal movement on the foot platform. A mechanical linkage is connected at one end by a sliding pivot to the plate and at its other end to one or both ends of the swiveled axle.

17 Claims, 4 Drawing Figures

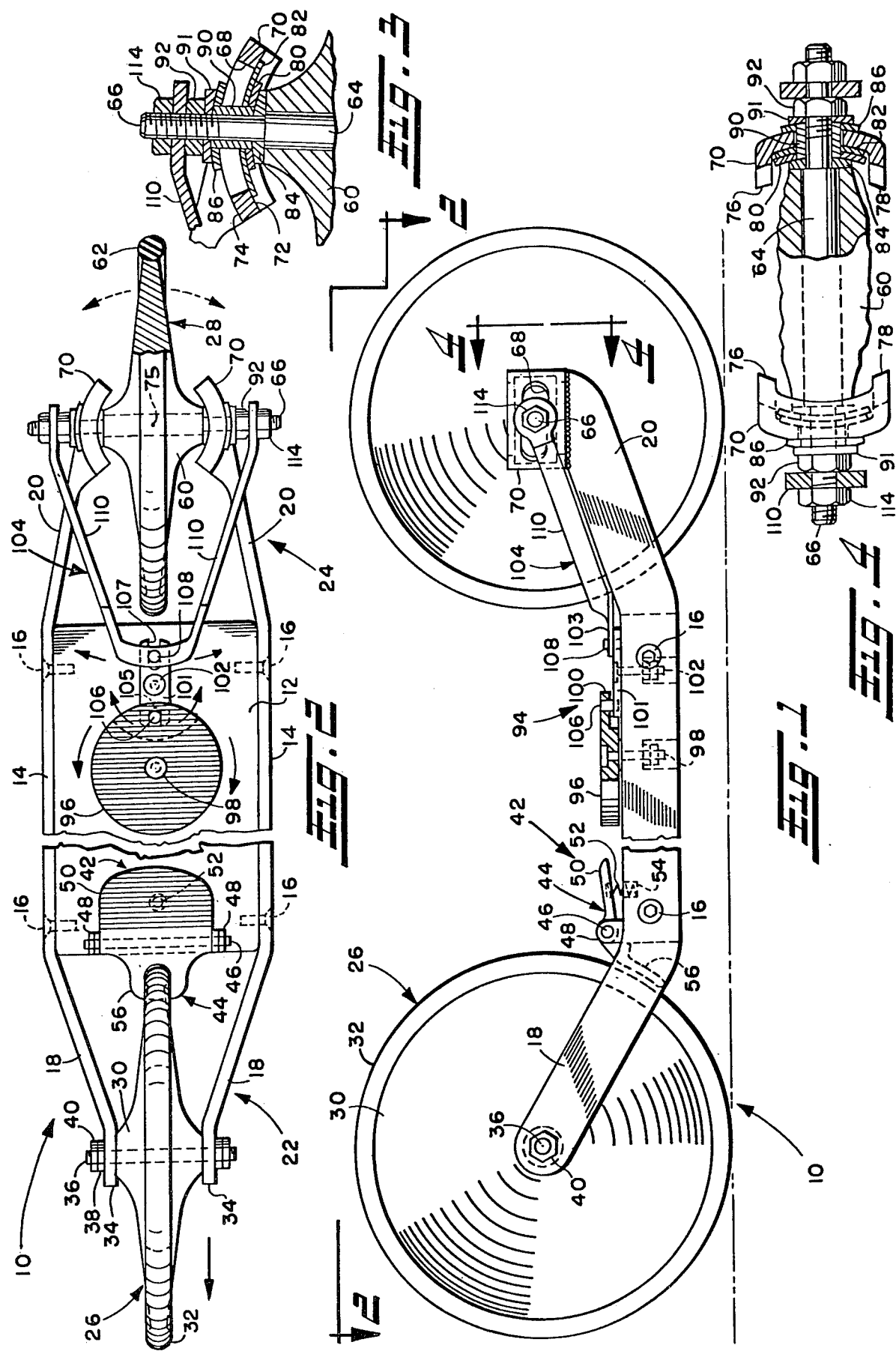

COASTER AND SWIVEL ASSEMBLY THEREFOR

This invention relates generally to a coaster and more particularly to a steerable coaster.

BACKGROUND OF THE INVENTION

Conventional coasters such as skateboards and scooters generally consist of a foot board or platform for one or both feet of the rider and front and rear wheels supporting the platform on the ground for rolling movement. In skateboards, the front and rear wheels typically are fixed against turning to the underside of the platform, and steering of the skateboard is effected by means other than turning the front or rear wheels. On the other hand, scooters typically employ steering handles which turn or steer the front wheel mounted thereon, such handle and wheel assembly being pivoted to the foot platform. For an example of a scooter employing a steerable front wheel, reference may be had to U.S. Pat. No. 2,460,395.

Other coasters are known and disclosed in the patented prior art. The toy coaster described in U.S. Pat. No. 3,771,811 includes a circular rear steering platform pivoted on a rigid elongated foot platform. The front wheels of the coaster are secured to the underside of the foot platform at its front end, whereas the rear wheels are secured to the underside of the rear steering platform. Steering action is acieved by turning of the foot resting on the rear steering platform.

The scooter described in U.S. Pat. No. 4,093,252 includes a board balancing and maneuvering handle fixed to the forward end of the foot board. In contrast to the typical scooter, the foot board has secured therebeneath, fore and aft, caster wheels which freely swivel through 360°. Turning of such scooter is achieved primarily by the rider shifting his/her weight and applying pressure with his/her feet to the foot board in a variety of modes.

Although not particularly relevant to the coaster art, U.S. Pat. No. 102,423 discloses a velocipede including two non-steerable but driveable rear wheels and a single front steering wheel. The steering wheel is supported on an axle having slotted bearings at its opposite axial ends. The slotted bearings slide on respective curved segments secured to the velocipede frame. Connecting rods are connected between the slotted bearings and the ends of a cross-bar pivoted on the velocipede frame and manipulable by the rider to effect front wheel steerage.

SUMMARY OF THE INVENTION

In contradistinction to known coasters, a coaster according to this invention includes a wheeled foot board or platform, the steerable wheel of which is rotatable on a swiveled axle for effecting a steering action. The swiveled axle extends through aligned horizontal slots in vertical axle guides at the ends of platform supporting frame members. The axle guides are spherically curved, such being struck from a common center intercepted by the pivot or swivel steering axis of the steerable wheel. Each axle guide has at least one axially extending flange on which rides a bearing element or roller assembled on the axle to provide relatively friction free swiveled or turning movement of the axle. The roller and another bearing element assembled on the axle have complementary curved surfaces in sliding bearing engagement with opposite sides of each curved guide for axially constrained swiveled or turning movement of the axle.

Further in accordance with this invention, a steering mechanism includes a foot steerable plate mounted for pivotal movement on the support platform to effect steerage of the steerable wheel. A mechanical linkage is connected at one end by a sliding pivot to the plate and at its other end to one or both axial ends of the swiveled axle. The linkage preferably includes a V-shape clevis and a pivot member which is centrally pivoted to the platform. The pivot member is slidingly pivoted at its ends to the plate and apex of the clevis, respectively, and the legs of the clevis pass on both sides of the steerable wheel and are connected to respective axial ends of the swiveled axle. Steering action accordingly is obtained by pivoting the foot steerable plate, such pivotal movement of the steerable plate being translated through the mechanical linkage to the steerable wheel for effecting steerage thereof.

According to another aspect of the invention, the steering mechanism may find application elsewhere for effecting controlled limited pivotal action of a member mounted for rotation on an axle. Such a mechanism includes a support for the axle, means for pivotally mounting the axle on the support, a control member pivotally mounted on the support, and a V-shape linkage. The V-shape linkage is slidingly pivotally connected at its apex end to the control member and at its legs respectively to opposite ends of the axle for effecting pivotal movement of the axle, and hence the rotatable member thereon, in response to pivoting of the control member.

According to still another aspect of the invention, the swiveled axle assembly may find application elsewhere.

To the accomplishment of the foregoing and related ends, the invention, then, comprises the features hereinafter fully described and particularly pointed out in the claims, the following description and annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary side elevation of a coaster according to the invention;

FIG. 2 is a fragmentary top plan view of the coaster of FIG. 1 as viewed generally from the line 2—2 thereof; and FIGS. 3 and 4 are enlarged fragmentary sections of the coaster of FIG. 1 respectively taken along the lines 3—3 and 4—4 thereof, showing in detail the swiveled axle assembly.

DETAILED DESCRIPTION

Referring now in detail to the drawing, a coaster according to the invention is indicated at 10 in FIGS. 1 and 2. The coaster 10 includes a foot board or platform 12 which is secured between a pair of side frame members 14 by screw fasteners 16. The platform 12 preferably is rectangular and is dimensioned to accommodate thereon a rider's feet, generally one in front of the other. The side frame members 14 each have front and rear end portions 18 and 20 which extend forwardly and rearwardly beyond the platform 12 and taper toward each other to form front and rear forks 22 and 24 for the front and rear wheels 26 and 28, respectively.

The front or nonsteerable wheel 26 includes a hub 30 which supports about its periphery a pneumatic or solid rubber tire 32. The hub 30, which is accommodated between the respective parallel distal front ends 34 of the front end portions 18, is rotatably supported on a front axle 36. The axle 36 extends through aligned apertures in the distal front ends 34 and is axially secured by axle nuts 38 and lock nuts 40. As seen in FIG. 1, the front end portions 18 extend upwardly from the platform so that the axle 36 or rotational axis of the front wheel is at a higher elevation than the platform to provide for improved coaster stability.

A brake assembly indicated at 42 is mounted on the platform 12 just rearwardly of the front wheel 26. The brake assembly includes a lever 44 which is centrally pivoted on a pin 46 secured between upstanding lugs 48 on the top of the platform 12. The rear arm or brake pedal 50 of the lever extends generally parallel to the platform and is biased upwardly away from the platform by a spring 52. As seen in FIG. 1, the spring 52 is located in a small vertical bore in the platform, and bears against the underside of the pedal 50 rearwardly of the pivot pin 46. The forward arm 56 of the lever 44, which may be of reduced width as seen in FIG. 2, extends generally downwardly from the pivot pin 46 and tangentially with respect to the front wheel 26. Normally, the arm 56 is maintained out of engagement with the tire 32 by reason of the spring 52, but will engage the tire for braking purposes upon depression of the brake pedal 50 by the rider.

Referring now additionally to FIGS. 3 and 4, the rear or steering wheel 28 can be seen to be constructed similarly to the front wheel 26, such rear wheel including a hub 60 which supports about its periphery a pneumatic or solid rubber tire 62. The rear wheel however is rotatably supported on a sleeve 64 on a rear axle 66. The rear axle 66 extends axially beyond the sleeve 64 in both axial directions and through aligned horizontal slots 68 in vertical axle guides or tabs 70 at the distal rear ends of the rear end portions 20 of the side frame members 14. Such axle guides 70 preferably are formed integrally with the side frame members or integrally secured thereto such as by welding. Like the front axle 36, the rear axle 66, and hence the rotational axis of the rear wheel 28, is at a higher elevation than the platform for improved stability. Preferably, the rotational axes of the front and rear wheels are at the same elevation.

The vertical axle guides 70, which are spherically curved, each have inner and outer curved bearing surfaces or sides 72 and 74 struck from the same center which is intersected by the pivot or swivel steering axis of the rear wheel indicated at 75. Each curved axle guide further has top and bottom axially inwardly extending flanges 76 and 78 which together define a raceway in which rides an inner spherically curved bearing element or roller 80 and a spherically curved stabilizer plate 82. Each inner roller 80 has a complementary curved axially outer bearing surface in sliding bearing engagement with the inner bearing surface of the correspondingly curved stabilizer plate 82 which in turn has an outer bearing surface in sliding bearing engagement with the inner bearing surface 72 of the correspondingly curved axle guide 70. The axially inner surface of each inner roller 80 bears against the correspondingly curved outer bearing surface of a washer 84 which has a flat inner surface that bears against the adjacent axial end of the sleeve 64 and also against the adjacent axial end of the rear wheel hub 60 to provide an axial stop therefor.

Outer bearing elements or washers 86 are assembled on the rear axle 66 outwardly of the curved axle guides 70. Each outer washer 86 has a complementary curved axially inner bearing surface in sliding bearing engagement with the outer curved surface 74 of the corresponding curved axle guide 70. Together, the outer washer 86 and inner roller 80 on each end of the axle 66 form an arcuate guide way therebetween in which is received the corresponding curved axle guide 70.

The inner roller 80 and outer washer 86 are closely fitted for rotation on spacer bushings 90 which are assembled on the axle 66 coextensively with the horizontal slots 68. Each spacer bushing 90 has an axial length greater than the thickness of the corresponding curved axle guide 70 so that the outer washer 86 and inner roller 80 can be thusly rotatably fitted thereon as seen in FIGS. 3 and 4.

It also can be seen in FIGS. 3 and 4 that the spacer bushings 90 are closely fitted for rotation in bores in the stabilizer plate 82 that has its top and bottom edges in sliding engagement with the top and bottom flanges 76 and 78, respectively. In addition, the spacer bushings 90 bear against the axially outer surfaces of the wahsers 84 and the axially inner surfaces of washers 91 assembled on the axle 66 between the outer washers 86 and axle nuts 92 threaded on the axial ends of the axle. It can be appreciated that each spacer bushing 90 thus functions as a spacer in that each has an axial length slightly greater than the combined thicknesses of the corresponding inner roller 80, stabilizer plate 82, axle guide 70 and outer washer 86 to preclude binding of the inner roller 80 and outer washer 86 against the axle guide upon tightening of the axle nut 92 against the washer 91. As indicated, the washer 91 has a flat axially outer face against which the axle nut is tightened and a spherical axially inner surface that engages the correspondingly curved outer surface of the outer washer and bears against the outer axial end of the spacer bushing.

The axle nuts 92 maintain the entire swiveled axle assembly in its assembled relationship, each nut 92 bearing against the corresponding washer 91 which in turn tightly bears against the washer 84 through the spacer bushing 90. The washers 84 are fixed against axially inner movement on the axle 66 by engagement with the ends of the sleeve 64. The wheel hub 60 has an axial length slightly less than that of the sleeve 64 so that it is freely rotatable about such sleeve, notwithstanding overtightening of the axle nuts 92. In addition, the inner rollers 80 and outer washers 86 are axially constrained by the washers 84 and 91 for free rotation on the spacer bushing 90. As the spacer bushings have diameters that are slightly less than the horizontal slots 68 in the axle guides 70 and the bores in the stabilizer plates 82, the inner rollers 80 can vertically shift slightly with respect to the axle guides and stabilizer plate so that it can roll on either one of the flanges 76 and 78, and normally on the top flanges 76. Accordingly, such rolling action provides for relatively friction free turning or swiveled movement of the rear axle 66 about the steering axis 75. Accordingly, the rear axle 66 is constrained for limited swiveled movement about the steering axis 75.

With the foregoing swiveled axle assembly, the axle 66 and hence the rear wheel 28 may be freely pivoted or swiveled about the steering axis 75. By turning the rear wheel on such axis, steering of the coaster can be achieved. To effect such steering, a steering mechanism 94 is provided.

Reverting to FIGS. 1 and 2, the steering mechanism 94 includes a circular foot steerable plate 96 located at the rear of the platform 12. The plate 96 is pivotally secured at its forward end to the platform by bolt assembly 98. The plate at its rear end is undercut so that a rear portion 100 thereof is vertically spaced from the top surface of the platform for positioning therebeneath the forward end of pivot or linkage member 101. The pivot member 101 is centrally pivoted to the platform by bolt assembly 102 and has its rear end positioned beneath the flat apex portion 103 of V-shape linkage or clevis 104. The forward end of pivot member 100 has a longitudinal (radial) slot 105 therein which recieves a short pivot pin 106 projecting downwardly from the rear portion 100 of the plate to effect a sliding pivot connection between the forward end of the pivot member and the plate whereas the rear end of the pivot member has longitudinal (radial) slot 107 therein which receives short pivot pin 108 projecting downwardly from the apex 103 of the clevis to effect a sliding pivot connection between the rear end of the pivot member and the clevis.

The legs 110 of the clevis 104 pass rearwardly on opposite sides of the rear wheel 28 and terminate at parallel distal ends. The distal ends have aligned apertures which are fitted on the projecting axial ends of the rear axle 66. The distal ends of the legs are secured on the rear axle against the axle nuts 92 by nuts 114. As will be appreciated below, pivotal movement of the plate is translated through the pivot member 100 and clevis to effect rear wheel steerage.

In use, a rider may position one foot on the coaster 10 and use the other foot for propulsion purposes. Once rolling, the foot used for propulsion purposes also may be positioned on the platform 12 and used to operate the brake assembly 44. The foot not used for propulsion purposes preferably rests on the foot steerable plate 96 to control the direction of the coaster. By turning such foot, pivoting of the foot steerable plate can be effected. Such pivotal movement of the steerable plate is translated through the pivot member 100 and clevis 104 to effect turning of the rear wheel 28 about the steering axis 66. As seen in FIG. 2, rotation of the plate in the clockwise direction effects clockwise turning of the rear wheel thereby causing the coaster to turn to the left. To turn the coaster to the right, the plate is pivoted counterclockwise to effect counterclockwise turning of the rear wheel.

Although the coaster described and illustrated is in the form of a skateboard-like device, it should be appreciated that a handle may be secured to the front end of the platform 12 or frame members 14 to provide a scooter-like device. It should also be appreciated that the coaster may be propelled in a direction opposite to that described, whereby the then front wheel would be the steerable wheel.

Although the invention is shown and described with respect to a preferred embodiment, it is obvious that equivalent alterations and modifications will occur to others skilled in the art upon the reading and understanding of the specification. The present invention includes all such equivalent alterations and modifications, and is limited only be the scope of the following claims.

The embodiments in which an exclusive property or privilege are claimed are defined as follows:

1. A coaster comprising a foot platform, front and rear platform supporting wheels mounted on said platform for rotation about their respective rotational axes, one of said wheels further being mounted on said platform for pivotal steering movement, a foot steerable member supported on said platform for pivotal movement about a vertical axis, and linkage means connected to said foot steerable member and connected to said one of said wheels for effecting pivotal steering movement of said one of said wheels in response to pivoting of said foot steerable member.

2. The coaster of claim 1 wherein said platform is lower than the rotational axes of said front and rear wheels.

3. The coaster of claim 2 wherein said platform is supported on a frame, said frame including front and rear laterally spaced end portions extending forwardly and rearwardly beyond said platform, said front and rear wheels being mounted between said front and rear end portions, respectively.

4. The coaster of claim 3 wherein said one of said wheels is rotatably supported on a swiveled axle in turn supported between the corresponding rear end portions, and said linkage means includes a clevis having its arms connected at their ends to the axial ends of said axle and its apex slidingly pivoted to said foot steerable plate.

5. The coaster of claim 4 wherein said corresponding end portions include spaced-apart axle guides having aligned substantially horizontal slots, said axle extending through said slots and being restrained by said axle guides for limited movement in the plane of such slots.

6. The coaster of claim 5 wherein said axle guides are spherical and each has an axially extending flange parallel to said slots, and further comprising inner and outer bearing means on said axle having complementary curved bearing surfaces in sliding bearing engagement with opposite curved sides of said axle guides for restraining said axle against axial movement while permitting swiveled movement thereof in said slots, and wherein one of said bearing means includes a roller which rides on said flange to provide relatively friction free swiveled movement.

7. The coaster of claim 6 including spacer means on said axle to preclude binding of said bearing means against said axle guides, said bearing means being rotatable on said spacer means.

8. The coaster of claim 7 wherein said spacer means include bushings on said axle coextensive with said aligned slots.

9. A mounting assembly for the turning wheel of a coaster comprising an axle on which said wheel is rotatably mounted, spaced apart curved axle guides in the coaster having aligned substantially horizontal slots, said axle extending through said slots and being restrained by said axle guides for limited movement in the plane of such slots, and bearing means on said axle having complementary curved surfaces in bearing engagement with the curved axle guides for restraining said axle against axial movement while permitting turning movement of the axle in said slots.

10. The assembly of claim 9 wherein said bearing means includes inner and outer bearing elements having complementary spherically curved bearing surfaces in sliding bearing engagement with opposite curved sides of said axle guides.

11. The assembly of claim 10 including spacer means on said axle to preclude binding of said bearing means against said axle guides.

12. The assembly of claim 11 wherein said spacer means includes bushings on said axle coextensive with said aligned slots, and said bearing elements are rotatable on said bushings.

13. The assembly of claim 10 wherein said axle guides each have at least one axially extending arcuate flange extending parallel to said slots, and one of said bearing elements rides on said flange to provide relatively friction free swiveled movement.

14. The assembly of claim 11 wherein said spacer means includes bushings on said axle coextensive with said aligned slots, and said one of said bearing elements includes a roller rotatable on a corresponding bushing.

15. A mechanism for effecting controlled limited pivotal action of a member rotatably mounted on an axle comprising a support for said axle, means for pivotally mounting said axle on said support, a control member pivotally mounted on said support, and V-shape linkage means slidingly pivotally connected at its apex end to said control member by means of a pin rotatable and longitudinally slidable in a slot and at its legs respectively to opposite ends of said axle for effecting pivotal movement of said axle in response to pivoting of said control member.

16. A mechanism for effecting controlled limited pivotal action of a member rotatably mounted on an axle comprising a support for said axle, means for pivotally mounting said axle on said support, a control member pivotally mounted on said support, V-shape linkage means connected at its apex end to said control member and at its legs respectively to opposite ends of said axle for effecting pivotal movement of said axle in response to pivoting of said control member, said support including spaced-apart curved axle guides having aligned slots, said axle extending through said slots and being restrained by said axle guides for limited movement in the plane of such slots, and inner and outer bearing means on said axle having complementary curved surfaces in bearing engagement with opposite curved sides of said axle guides for restraining said axle against axial movement while permitting swiveled movement thereof in said slots.

17. A mounting assembly for an axle having a member rotatably mounted thereon such as the turning wheel of a coaster, comprising a support for said axle, said support including spaced-apart curved axle guides having aligned slots, said axle extending through said slots and being restrained by said axle guides for limited movement in the plane of such slots, and bearing means on said axle having curved surfaces complemental to and in bearing engagement with curved surfaces on the curved axle guides for restraining said axle against movement while permitting swivel movement of said axle in said slots.

* * * * *